Oct. 1, 1968  NOBUO OZAKI  3,403,577
BRAKE OPERATING DEVICE FOR BICYCLE HANDLES
Filed Oct. 27, 1966  2 Sheets-Sheet 1
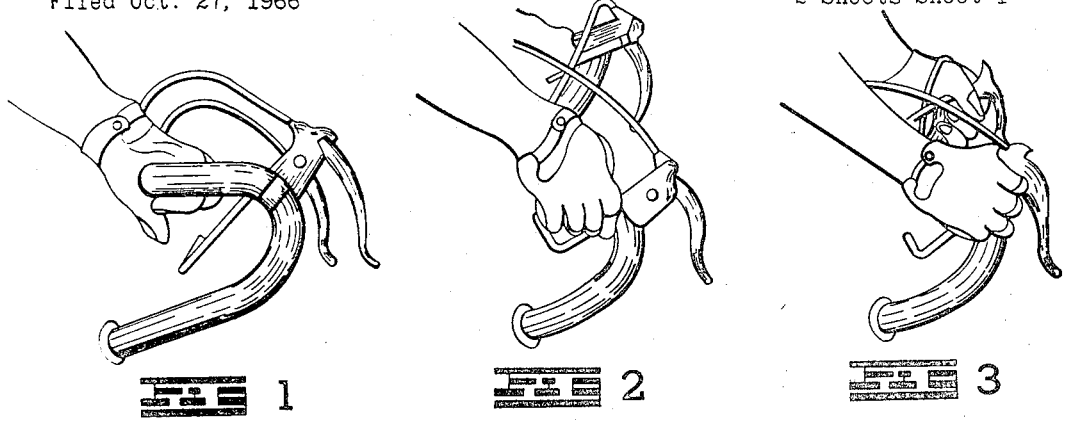
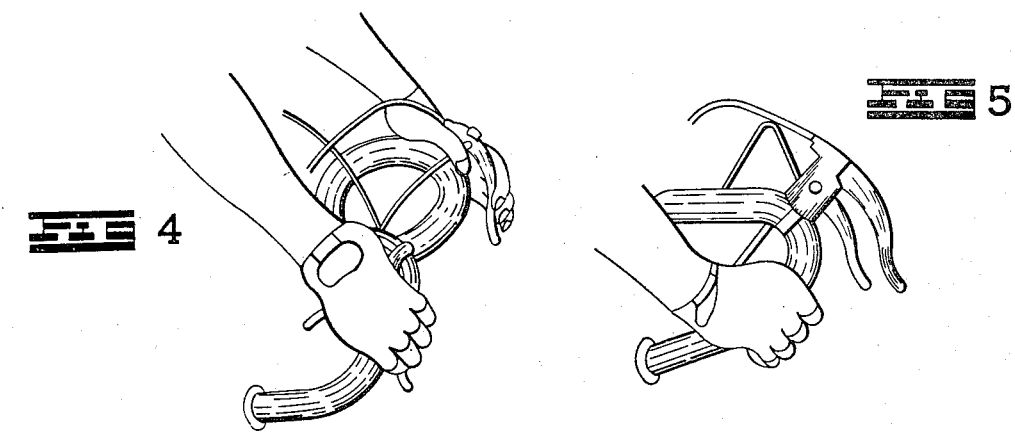
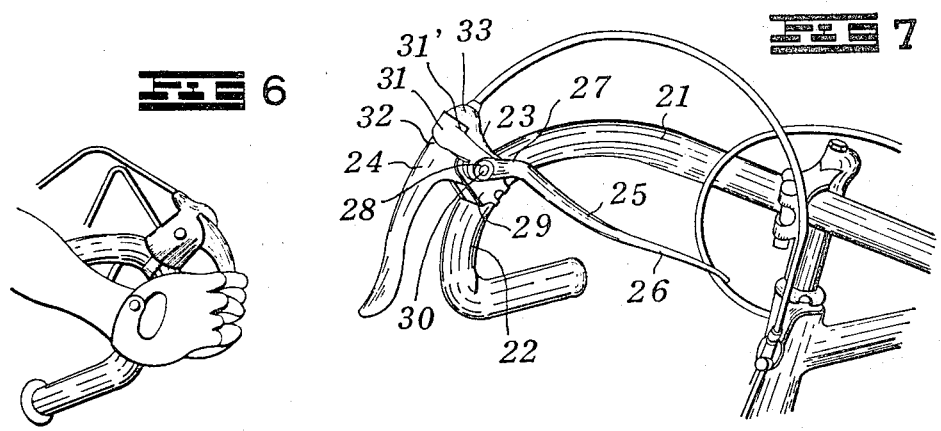

Oct. 1, 1968   NOBUO OZAKI   3,403,577
BRAKE OPERATING DEVICE FOR BICYCLE HANDLES
Filed Oct. 27, 1966   2 Sheets-Sheet 2
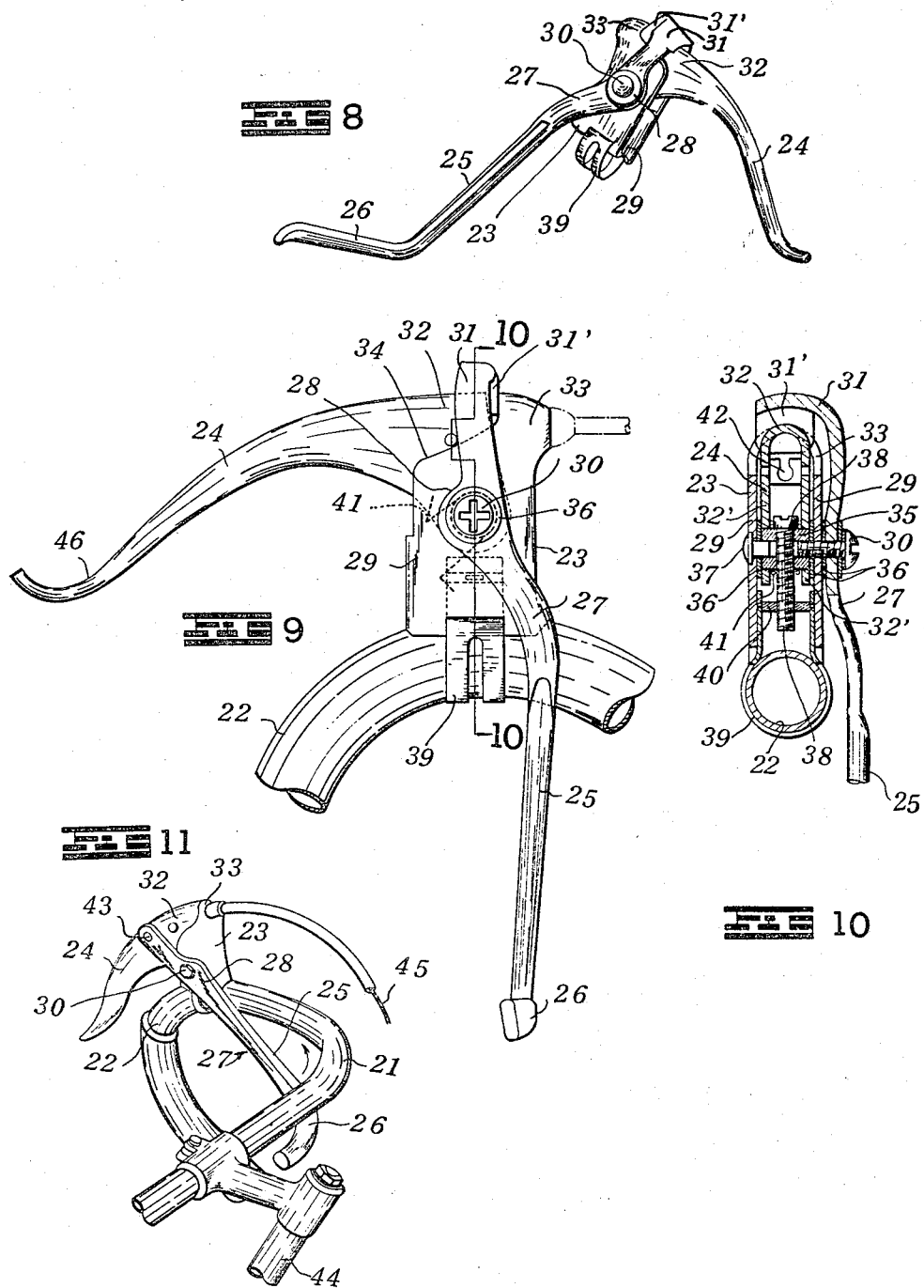

United States Patent Office 3,403,577
Patented Oct. 1, 1968

3,403,577
BRAKE OPERATING DEVICE FOR BICYCLE HANDLES
Nobuo Ozaki, Sakai-shi, Osaka-fu, Japan, assignor to Yoshigai Kikai Kinzoku Co., Ltd., Kawachi-shi, Osaka-fu, Japan
Filed Oct. 27, 1966, Ser. No. 589,866
4 Claims. (Cl. 74—480)

ABSTRACT OF THE DISCLOSURE

A drop type bicycle handle is provided with hand operable brake means having the usual lever member pivoted to a bracket secured to the handle bars. An auxiliary lever is rigidly secured to the hand operable lever and extends along the handle bars to enable the brake means to be operated from an auxiliary position.

---

The present invention relates to a brake operating device fitted to the handle, and more particularly, to the drop handle of a bicycle wherein the brake lever for operating the control shoe of the front wheel or the rear wheel can be always safely and securely operated from any optional gripping position of the drop handle by providing an auxiliary lever which interlocks with said brake lever.

In general, as is widely known, the steering handle of a bicycle may be divided into three types: up-handle, flat handle and drop handle. It is also known that the drop handle is adapted to a racing bicycle employed in a truck race or road race which requires high speed running, or to a cycling tour bicycle which is also expected to run a long distance. Further, the drop handle, with its highly efficient functional structure, can provide stable as well as effective running positions which gives minimum fatigue to the rider by allowing the rider to suitably select the gripping position in accordance with the running conditions or purposes, for example, running from low speed to high speed or from a flat place to a slope.

The drop handle of this invention, as will be explained in detail later, consists of a substantially horizontal straight rod section provided on the fork shaft for the front wheel while crossing said fork shaft at right angles, and the substantially U-shaped bent rod sections which extend forward from both ends of said straight rod section. The brake levers, as is known, are attached at the substantially middle part, or slightly upward thereof, of the bent rod sections by means of fitting brackets. When running on a flat place or on a slope, or when speed change is attempted from low to middle and then to high speed while running along such places, the rider grips pertinent positions on said straight rod section or bent rod sections of the drop handle so as to take the best gripping posture in accordance with respective conditions or purposes. However, the rider will find it impossible to operate these levers at these positions simultaneously with both hands which grip the handle. This is readily conceivable from the distance between the gripped positions and the brake levers or the difference of angles thereof. Thus, the rider must sometimes run in an unsafe condition where he quits the grasp upon the handle to hold tightly to the levers instead to operate them. Such unstable handling operation will impede smooth running of the bicycle and may invite swaying of the bicycle body or momentary interruption of steering, which may cause the bicycle to fall down, hit or collide with other vehicles or pedestrians. Particularly, in view of the fact that the drop handle is predominantly adopted in a comparatively high speed bicycle, loss of pertinent braking time results in defective damping operation.

The present invention is designed to eliminate these defects. According to this invention, in order to operate the brake levers on the drop handle correctly and timely and to avoid interruption of steering by the handle, there are provided auxiliary levers of such shape and size and at such position as they can be manipulated by one or more fingers of the hands at the gripped positions on either the straight rod section or the bent rod sections. The auxiliary levers are coupled or engaged to the brake levers at the fixed positions on the drop handle so as to be interlocked with part of said brake levers, whereby when riding on a bicycle and gripping desired portions of the drop handle, the rider, in case of need of braking operation, can immediately operate the brake levers easily and surely through the medium of said auxiliary levers while gripping the handle and can also reduce the speed or bring the vehicle to stop by effecting adequate braking operation. This will prove helpful to warrant safety at the occasion of high speed running or running through congested city streets. Thus, according to the present device, it is possible for the rider to safely and effectively grip any desired portions of the drop handle in accordance with the purpose of and condition of running.

It is, therefore, an object of the present invention to provide, on the drop handle, an auxiliary lever of which the part parallel to the bent section of the handle and the part parallel to the straight section are substantially L-shaped, said auxiliary lever being so arranged that a part thereof is engaged in an interlocked relation to a part of a brake lever fitted on the handle.

It is another object of the present invention to provide, on the drop handle, an auxiliary lever of which the part parallel to the bent section of the handle and the part parallel to the straight section are substantially L-shaped, with said auxiliary lever being so arranged that a part thereof is directly coupled to a part of a brake lever mounted on the handle.

Now, some preferred embodiments of the present invention will be illustrated with reference to the accompanying drawings, in which:

FIGURES 1 through 6 are the side views of a commonly used drop handle illustrating the variously changed gripping positions of the handle according to the purpose of use and condition of running.

FIGURE 7 is a perspective view of the right-hand side of the handle illustrating an embodiment in which a part of the auxiliary lever is engaged to a part of the brake lever.

FIGURE 8 is a perspective view of an auxiliary lever fitted to the left side of the handle and a brake lever fitting bracket shown as they are dismounted from the handle.

FIGURE 9 is an enlarged front view showing details of the auxiliary lever.

FIGURE 10 is a sectional view as taken along the line 10—10 of FIGURE 9.

FIGURE 11 is a perspective view of the left-hand side portion of the handle illustrating an embodiment in which a part of the auxiliary lever is directly coupled to the brake lever.

Referring to FIGURES 1 to 6, there is shown a commonly used drop handle illustrating the correct handle gripping positions according to the running conditions and purposes. In the figures, numeral 21 denotes the straight rod section of the drop handle, with the upper end of the fork shaft of the front wheel being directly coupled to the center part of said straight rod section 21. Numeral 22 indicates the substantially parallel U-shaped bent rod sections which are extended forwardly from both ends of said straight rod section 21 at substantially right angles therewith. Numeral 24 is a brake lever and 23 a supporting bracket for said lever. It will be seen that the bracket 23 is secured to the front upper side of the bent rod 22 and the brake lever 24 is movably and pivotally supported by said bracket 23. One end of said lever 24 is connected to the end of an operating wire for the brake shoe on the front wheel, said wire being kept in a stretched condition by springs or other means and projected in front of the bent rod section 22 as in the case of the conventional drop handles and brake levers.

Referring to FIGURE 1, a gripping position is shown which is used when running along a flat ground or at a speed of about 20 km./h., in which case the hands of the rider grip the straight rod section 21 to steer it. FIGURE 2 illustrates a gripping position for running along a gentle slope or a somewhat rugged road or at a speed of about 25 to 30 km./h. In this case, it is preferred for the rider to grip the portions of the handle closer to the bracket 23 on the bent section 22. FIGURE 3 demonstrates a gripping position in which the bicycle is run at a speed of more than 30 km./h. or along a steep slope, wherein the rider grips the positions on the handle where the brackets 23 are located. The rider, in this case, is also required to take a posture as if jerking the entire handle toward his breast and to step strongly on the pedals. Since a finger or fingers of each hand gripping the bracket 23 can easily reach the brake lever 24, the rider can operate the lever 24 in a manner as shown in FIGURE 4, thereby to effect braking. FIGURE 5 shows a case when the bicycle is run at a particularly high speed, or at an extremely steep slope or extremely bad road. Under these conditions, it is preferable to grip the lower positions of the bent rod sections 22 as shown in the figure. In this case too, since fingers of the hand or hands gripping said lower positions can easily reach the brake levers 24, the operation of said levers 24 can be smoothly effected. As will already be apparent from the figures shown, in the cases illustrated in FIGURES 1 and 2, the fingers of the hands gripping the straight rod section 21 and the bent rod sections 22 cannot reach the brake levers. In such case, it is required of the rider to slide the gripping hands along the rod or to free his hand or hands for a moment to hold the brake levers 24. It is evident that such performance, owing to the inevitable interruption of steering, may invite rolling or unstability of the vehicle body, delay of braking time, or other unfavorable events.

In the present invention, to eliminate these conventional defects, there is provided, as shown in FIGURES 7 and 8, an auxiliary lever 27 made of metal or other similar solid rod-shaped materials and comprising a part 25 parallel to the plane of said bent section 22 of the drop handle and a part 26 parallel to the straight section 21, said both parts 25 and 26 being integrally formed in a substantially L-shaped configuration. The head 28 of this lever 27 is pivotally supported on one side wall 29 of said bracket 23 through a check shaft 30. The engaging wall 31' of an interlocking element 31 extended from the head 28 is interposed between the head 32 of the brake lever 24 and the guide sleeve 33 of the bracket 23. The details of this arrangement are shown in FIGURES 9 and 10. It will be seen that the bracket 23 is shaped like a box having an opening 34. Between both side walls 29, 29 thereof is secured a lever shaft 35 by means of said check shaft 30 and a stopper 37 at the opposite end through the medium of bushes 36 made of nylon resin or the like. Rotatably supported on this lever shaft 35 are both side walls 32', 32' of the head 32 of the brake lever 24. A set-screw 38 run transversely across the lever shaft 35 is secured in a screwed-in relation to a seating member 40 of a clip band 39 coiled around the bent rod section 22, thereby fixing the bracket 23. Other members in the figures include a spring 41 which always keeps the brake lever 24 biased in a clockwise direction as viewed in FIGURE 9, whereby the engaging wall 31' of the interlocking element 31 of the auxiliary lever 27 which is interposed between the head 32 of the lever 24 and the guide sleeve 33 of the bracket 23 is pressed to the sleeve 33 side by the head 32. Numeral 42 indicates the attachment slot on lever 24 for a wire connector for operating the brake shoe of the front wheel. Since the operational mechanism of the brake shoe by this brake lever through the wire 45 can be completely identical to the conventional ones, no particular illustration thereof is given here. Although only one side of the handle is shown in the figures, it should be understood that the auxiliary brake levers 27, 27 are provided symmetrically at the bent sections on both sides of the handle.

FIGURE 11 shows an embodiment in which one end of the auxiliary lever 27 is directly coupled on the head 32 of the brake lever 24 by a check shaft 43. Other details of this arrangement are completely the same as shown in FIGURES 7 to 10. Numeral 44 indicates a fork shaft and 45 is an operating wire.

In the embodiment shown in FIGURES 7 through 10, in addition to the normal brake lever 24, there is provided an auxiliary lever 27 which comprises a section 25 parallel to the bent rod 22 and projecting into the space surrounded by the U-shape thereof, as shown in the figures, and a section 26 positioned below the straight rod section 21 so as to be parallel thereto, said both sections 25 and 26 are integrally connected to form an L-shaped structure. It is thus possible for the rider to easily and correctly operate the normal brake lever 24 by maneuvering these auxiliary levers 27 from the gripping positions on the drop handle as shown in FIGURES 1 to 6. For instance, in case the rider grips the positions on the straight rod section 21 as shown in FIGURE 1, the rider can reach a finger or fingers of his gripped hand or hands to the section 26 of the lever 27 positioned below and parallel to said straight rod section 21, so that when the section 26 is pulled toward the straight rod section 21, the head 28 is rotated around the check shaft 30 as its fulcrum, thus causing the interlocking element 31 to rotate in the counterclockwise direction as viewed in FIGURE 9 to thereby urge the head 32 of the brake lever 24 to move in the same direction, whereby the brake lever 24 is revolved counterclockwise in FIGURE 9 around the lever shaft 35 as the fulcrum, thus practicing, in effect, an action which is otherwise attained by gripping the tail 46 of the lever 24 and jerking it inwards, thereby to effect the braking operation. There is thus no need of moving the gripping hands.

In the case of FIGURE 2, the rider can reach a finger or fingers of his hand(s) gripping the upper side of the bent rod sections 22 to the section 25 of the auxiliary lever 27 which is parallel to the plane of said bent section 22 so that it will be apparent that the same braking operation can be attained by pulling said section 25 towards the straight rod section 21 and practicing other operations as described above. In the case of FIGURES 3 to 6, the brake levers 24 can be operated directly. But it is also possible to operate the sections 25 of the auxiliary levers 27 with other fingers, so that either levers 24 or 27 may be selectively operated depending on the situation. In operating the normal brake levers 24, namely, in effecting the operation of gripping the tail 46 of said brake levers and jerking it inwards, the presence of the auxiliary levers 27, which simply stay at their fixed positions, does not obstruct the operation of the levers 24. In the case of FIGURE 11, operation may be effected in the same manner as in FIGURES 7 to 10, except that the levers 24 and 27 are interlocked by shaft 43 for unitary movement under all operating conditions. Evidently, the resulting effects are completely identical to those attained in the above-described embodiments.

As will be apparent from the embodiments described above, it is possible with the present invention to compose a basic structure whereby, in the operation of the drop handle, irrespective of the positions on the handle gripped by the rider's hands, either on the straight rod section 21 or on the bent rod sections 22, the operation of the brake levers 24 spaced from the gripped positions can be securely effected simply by moving a finger or fingers of the hands at the gripped positions, thanks to the provision of the auxiliary levers 27. Namely, by the provision of the substantially L-shaped levers 27 comprising a section 26 parallel to the straight rod section 21 and a section 25 parallel to the bent rod section 22, each braking lever stays within easy reach of the rider's fingers from any position on either the straight rod section or bent rod section through said sections 25 and 26, thus permitting a timely braking operation which is often required to be quickly effected. It is to be noted that the heads 28 of the levers 27 are pivotally supported so that the whole structure may be operated according to the theories of levers. Thus, the transmission of the necessary force to the interlocking elements 31 can be readily attained and the sufficient force to actuate the brake levers 24 may be obtained with few efforts. These arrangements according to the present invention can provide sure braking performance of the bicycle in case of running at a high speed or along a steep slope and assure safe running of the vehicle. It is thus possible with the present invention to overcome various traffic dangers and obstacles which may be suffered by a comparatively high speed bicycle having this type of drop handle.

It is to be understood that various changes and modifications in designs also belong to the scope of the present invention.

What is claimed is:

1. A brake operating device adapted to be secured to a drop type bicycle handle having a straight crossbar and curved downwardly and forwardly facing U-shaped sections at each end thereof comprising bracket means adapted to be secured on said U-shaped sections, main brake lever means pivotally secured to said bracket means and lying substantially in the plane of said U-shaped section, flexible means secured to said main brake lever means for operating the brakes of a bicycle, auxiliary brake lever means pivotally secured to said bracket means in interlocking engagement with said main brake lever means whereby the brakes on the bicycle may be effectively operated by either lever.

2. A brake operating device as set forth in claim 1 wherein said auxiliary brake lever means is comprised of a first section extending substantially parallel to the plane of said U-shaped section and a second section integral with said first section at a right angle thereto and extending parallel to and below said straight crossbar.

3. A brake operating device as set forth in claim 1 wherein said auxiliary brake lever means is mounted in abutting relation with said main brake lever means whereby said main brake lever means may be operated independently of said auxiliary brake lever means.

4. A brake operating device as set forth in claim 1 wherein said main brake lever means and said auxiliary brake lever means are connected together for conjoint movement at all times.

References Cited

UNITED STATES PATENTS 1,706,542　3/1929　Pugh et al. _____ 74—488

FOREIGN PATENTS 921,292　5/1947　France.
1,124,891　10/1956　France.

FRED C. MATTERN, JR., *Primary Examiner.*

B. T. CALLAHAN, *Assistant Examiner.*